(12) United States Patent
Gustafsson

(10) Patent No.: US 11,162,874 B2
(45) Date of Patent: Nov. 2, 2021

(54) MOVABLE TEST DEVICE FOR DYNAMIC VEHICLE TESTING

(71) Applicant: Autoliv Development AB, Vargarda (SE)

(72) Inventor: Per Gustafsson, Vårgårda (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 149 days.

(21) Appl. No.: 16/603,464

(22) PCT Filed: Apr. 3, 2018

(86) PCT No.: PCT/EP2018/058432
§ 371 (c)(1),
(2) Date: Oct. 7, 2019

(87) PCT Pub. No.: WO2018/185073
PCT Pub. Date: Oct. 11, 2018

(65) Prior Publication Data
US 2021/0088417 A1 Mar. 25, 2021

(30) Foreign Application Priority Data
Apr. 7, 2017 (FR) ...................................... 1753054

(51) Int. Cl.
*G01M 17/00* (2006.01)
*G01M 17/04* (2006.01)
(52) U.S. Cl.
CPC .................................. *G01M 17/04* (2013.01)

(58) Field of Classification Search
CPC ............................ G01M 17/00; G01M 17/007
See application file for complete search history.

(56) References Cited

U.S. PATENT DOCUMENTS

| 4,455,866 | A | * | 6/1984 | Barrigar | ............ | G01M 17/0074 |
| | | | | | | 73/116.07 |
| 4,942,762 | A | * | 7/1990 | Schober | ............ | G01M 17/0074 |
| | | | | | | 73/116.07 |

(Continued)

FOREIGN PATENT DOCUMENTS

| EP | 2845775 A1 | 3/2015 |
| FR | 2093197 A5 | 1/1972 |

(Continued)

OTHER PUBLICATIONS

International Search Report of the International Searching Authority for PCT/EP2018/058432 dated Oct. 8, 2018.

(Continued)

*Primary Examiner* — Eric S. McCall
(74) *Attorney, Agent, or Firm* — Dickinson Wright PLLC

(57) ABSTRACT

A movable test device for dynamic vehicle testing, intended to support a target object for the test vehicle, having a frame with a support plate arranged to receive the target object; a plurality of running gears, each having at least one wheel, arranged to roll on a rolling surface formed by a test track; and propulsion means linked to at least one of the wheels in order to propel the device on the rolling surface. The test device includes a damper arranged to damp a relative movement between at least one of the wheels and the support plate.

14 Claims, 1 Drawing Sheet

(56) References Cited

U.S. PATENT DOCUMENTS

| | | | | |
|---|---|---|---|---|
| 4,953,391 | A | * | 9/1990 | Schober ............ G01M 17/0074 73/116.07 |
| 5,589,629 | A | * | 12/1996 | Quinn ................. G01M 15/108 73/118.01 |
| 5,970,438 | A | * | 10/1999 | Clark ....................... B61K 9/08 702/184 |
| 2002/0121144 | A1 | * | 9/2002 | Stein ................... G01M 17/007 73/862 |
| 2004/0168503 | A1 | * | 9/2004 | Kojima ............. G01M 17/0078 73/12.01 |
| 2008/0275682 | A1 | * | 11/2008 | Langer ............... G01M 17/0072 703/8 |
| 2009/0126510 | A1 | * | 5/2009 | Engstrom ......... G01M 17/0072 73/862.14 |
| 2013/0016020 | A1 | | 1/2013 | Kelly et al. |
| 2013/0016027 | A1 | | 1/2013 | Kelly et al. |
| 2013/0017346 | A1 | | 1/2013 | Kelly et al. |
| 2013/0018528 | A1 | | 1/2013 | Kelly et al. |
| 2013/0162479 | A1 | | 6/2013 | Kelly et al. |
| 2014/0039727 | A1 | | 2/2014 | Kelly et al. |
| 2014/0045631 | A1 | | 2/2014 | Kelly et al. |
| 2014/0058589 | A1 | | 2/2014 | Kelly et al. |
| 2014/0250997 | A1 | * | 9/2014 | Sprenger ................ G01M 17/02 73/146 |
| 2019/0301978 | A1 | * | 10/2019 | Geluk ..................... G06F 17/16 |

FOREIGN PATENT DOCUMENTS

| | | |
|---|---|---|
| FR | 2306097 A1 | 10/1976 |
| FR | 2961748 A1 | 12/2011 |
| FR | 3041754 A1 | 3/2017 |
| WO | WO2018/007458 A2 | 1/2018 |

OTHER PUBLICATIONS

Translation of the International Search Report of the International Searching Authority for PCT/EP2018/058432 dated Oct. 8, 2018.

* cited by examiner

MOVABLE TEST DEVICE FOR DYNAMIC VEHICLE TESTING

CROSS-REFERENCE TO RELATED APPLICATIONS

This application is a 35 U.S.C. § 371 national phase of PCT International Application No. PCT EP2018/058432, filed Apr. 3, 2018, which claims the benefit of priority under 35 U.S.C. § 119 to French Patent Application No. 1753054, filed Apr. 7, 2017, the contents of which are incorporated herein by reference in their entirety.

FIELD OF THE INVENTION

The present invention generally relates to a testing device arranged to roll on a test track also being travelled along by a motor vehicle to be tested. In particular, the testing device according to the invention is intended to carry a target or an object that forms part of the dynamic test with the test vehicle. In particular, the invention relates to a platform that supports a target (a dummy representing a pedestrian, or a simplified model of the vehicle) that must move on the track to simulate a driving situation with moving obstacles (to be avoided or struck) for the test vehicle.

BACKGROUND AND INTRODUCTORY DESCRIPTION OF PREFERRED EMBODIMENTS OF THE INVENTION

Devices are known from the prior art for conducting such tests, as disclosed in document US2016054199. However this system has the shortcoming of rebounding or forming a hard obstacle during the test if the test vehicle touches the device.

Document US 2013162479 A1 discloses a testing device with a platform and means of pneumatic suspension for adjusting a height. Such means of adjustable-height pneumatic suspensions are therefore pneumatic cylinders and cause rebounds when an impact is applied to the platform (when a test vehicle strikes an object fixed onto the platform or rides onto the platform), so severely that such rebounds can cause a collision between the platform and the test vehicle.

One goal of the present invention is to address the shortcomings of the prior art mentioned above, and in particular, firstly, to propose a movable test device to conduct a dynamic test with a test vehicle, while limiting the risks of rebound or damage for the test vehicle during the dynamic test and improving the mobility of the testing device.

To achieve this, a first aspect of the invention relates to a movable test device for dynamic vehicle tests, intended to support a target object for the test vehicle, said device comprising:
a frame with a support plate arranged to accommodate the target object,
a plurality of running gears each with at least one wheel, arranged to roll on a rolling surface formed by a test track,
means of propulsion, in connection with at least one of the wheels in order to propel the device on the rolling surface,
characterized in that the testing device comprises damping means, arranged to damp a relative movement between at least one of the wheels and the support plate. The testing device according to this implementation comprises damping means, unlike devices of the prior art, so that vibrations or impacts caused by movement or potential contact with the test vehicle will be damped, which considerably reduces the possibilities of rebound, and increases the energy dissipation capabilities. The damping means are intended to dissipate energy during the movement of the platform relative to the wheel, and are not comparable to simple means of suspension, which merely give the wheel the ability to move relative to the platform while generally returning to its position by an elastic means (a spring, a gas cylinder, etc.).

In particular, conventional means of pneumatic suspension do not effectively reduce an oscillation amplitude, because they are simple cylinders forming gas springs. They do not comprise any restrictions placed between two chambers, which would dissipate energy to damp those oscillations. Indeed, such a restriction is a source of energy loss, and importantly is not included, in particular if the pneumatic suspensions are of adjustable-height, because that would require increasing the power of the pneumatic pump that is coupled to the adjustable-height means of suspension to control them. The invention, by proposing damping means, is distinct from these means of pneumatic suspension, because the spring effect is eliminated.

Additionally, it cannot be assumed that wheels equipped with tires form damping means. Indeed, a wheel with a tire rebounds against the ground, and does not damp an impact.

Advantageously, the support plate forms a support plane, generally parallel to the rolling surface.

Advantageously, at least one of the running gears comprises:
an oscillating arm carrying one of the wheels, articulated on the frame,
means of suspension, with a first end articulated on the frame,
a tipper, with a first end articulated on the frame and a second end linked to a second end of the means of suspension,
a rod linking the oscillating arm to the tipper,
wherein the rod has an end fastened onto the tipper, between the first end of the tipper and the second end of the tipper. The running gear according to this embodiment enables the means of suspension to engage in a lengthy stroke, even if the movement of the oscillating arm is small, due to the fastening of the rod onto the tipper.

In other words, a projection of the rod/tipper articulation along a straight line connecting the tipper/frame and tipper/means of suspension articulations lies between the tipper/frame and tipper/means of suspension articulations.

Advantageously, the means of suspension are embedded in, or integrated with, or coupled to the damping means. Consequently, the first end of the means of suspension is also the first end of the damping means, and the second end of the means of suspension is also the second end of the damping means.

Advantageously, the means of suspension form a spring-damper combination with the damping means. Such a spring-damper combination is compact while requiring little maintenance.

Advantageously, in a projection on the rolling surface or the support plane, the articulation of the tipper on the frame is arranged between the articulation of the oscillating arm on the frame and the first end of the means of suspension. In other words, the oscillating arm and the means of suspension (and of damping) are arranged on either side of the tipper, which results in an implementation with low thickness and low total height.

Advantageously, the articulation of the first end of the means of suspension or of damping has a pivot axis which is located within a plane P1 parallel to the support plane or the rolling surface, which is less than 20 mm and more preferably less than 10 mm away from a plane P2 containing a pivot axis of the articulation of the oscillating arm on the frame, which is also parallel to the support plane or the rolling surface.

Advantageously, a plane containing a pivot axis of the articulation of the tipper is arranged above the planes P1 and P2, but less than 50 mm and preferably less than 40 mm away from them.

Advantageously, a vertical plane P'3 (or one perpendicular to the rolling surface or the support plane) containing the pivot axis of the articulation of the tipper is arranged between a vertical plane P'1 (or one perpendicular to the rolling surface PR or the support plane PS) containing the pivot axis of the articulation of the first end of the means of suspension or of damping and a vertical plane P'2 (or one perpendicular to the rolling surface PR or the support plane PS) containing the pivot axis of the articulation of the oscillating arm on the frame.

In other words, the means of damping are articulated on the frame by an anchor point separate from that of the oscillating arm, which leaves great freedom of design, to achieve a flat device.

Advantageously, the means of suspension are substantially parallel to the rolling surface and/or the support plate (or the support plane). As above, this results in an implementation with low thickness or low total height.

Advantageously, the articulation of the means of suspension, the articulation of the tipper, and the articulation of the oscillating arm are all arranged between two planes parallel to the rolling surface (or support plane) and separated by a predetermined distance less than an outer diameter of the means of suspension. As above, this results in an implementation with low thickness or low total height. For instance, the predetermined distance is less than or equal to 80 mm.

Advantageously, the outer diameter of the means of suspension is a diameter of a coil spring forming the means of suspension.

Advantageously, the second end of the means of suspension is located under a plane parallel to the rolling surface or support plane, and passing through the articulation of the tipper on the frame; it being understood that "under" refers to when the device is in its running position, meaning when the wheels are in contact with the rolling surface. Thus, the plane parallel to the rolling surface or support plane, and passing through the articulation of the tipper on the frame, is located above the rolling surface, and the second end of the means of suspension is therefore located between the rolling surface and the plane parallel to the rolling surface that passes through the articulation of the tipper on the frame. Such an implementation results in a high degree of compactness, because the damping means are under the articulation of the tipper on the frame. In such a case, the damping means are not protruding.

Advantageously, the two ends of the means of suspension are located under a plane parallel to the rolling surface or support plane, and passing through the articulation of the tipper on the frame. Such an implementation results in compactness, because the damping means are under the articulation of the tipper on the frame. In such a case, the damping means are not protruding.

Advantageously, an envelope fully containing the means of suspension and the damping means is located under a plane parallel to the rolling surface or support plane, and passing through the articulation of the tipper on the frame Advantageously, the first end of the tipper is pivotably mounted on the frame.

Advantageously, the first end of the means of suspension is pivotably mounted on the frame.

Advantageously, the oscillating arm is pivotably mounted on the frame.

Advantageously, the pivot link axes of the oscillating arm, the means of suspension, and the tipper on the frame are parallel to one another.

Advantageously, the rod is mounted on the oscillating arm, at a predetermined distance from the articulation of the oscillating arm on the frame. Such a lever arm makes it possible to translate the movement of the oscillating arm to the tipper. In other words, the rod is mounted on the oscillating arm at a distance (strictly positive), so as to create a lever arm (the rod is not aligned with the rotational axis of the oscillating arm on the frame).

Advantageously, the device comprises a cover arranged between the second end of the means of suspension and the tipper. Such a cover is therefore a metal mount carrying the axis of a pivoting part. In particular, the cover makes it possible to keep the system from being hyperstatic, by adding a pivot link between the second end of the means of suspension and the tipper.

Advantageously, the tipper is movable between two positions, and can have an intermediate position perpendicular to the rolling surface or support plane.

Advantageously, the oscillating arm is movable between two positions, and a straight line passing through the articulation of the oscillating arm with the frame and through an articulation between the oscillating arm and the rod may have an intermediate position perpendicular to the rolling surface or support plane.

Advantageously, the articulation of the means of suspension on the frame, the articulation of the tipper on the frame and the articulation of the oscillating arm on the frame are all pivot links, each one defining a pivot axis perpendicular to the same plane perpendicular to the rolling surface. In other words, all the pivot axes are parallel to one another.

Advantageously, the articulation of the means of suspension on the frame, the articulation of the tipper on the frame and the articulation of the oscillating arm on the frame are arranged to be intersected by the same intersecting plane perpendicular to the rolling surface. In other words, the organs are substantially in line and all arranged behind one another, affording a low total height.

Advantageously, the support plate is arranged to be able to pass under the test vehicle without touching it. It is therefore important to minimize the rebounds in order to avoid any collision between the device and the frame, subframes, bumpers, or underfloor parts (fuel lines, brake lines) of a test vehicle that passes above them, which is made possible by the damping means. This combination or addition of damping means with so thin a platform or device is counter-productive to the need to decrease the total height in order to be able to pass under increasingly low vehicles.

Advantageously, the damping means comprise adjustment means for adjusting an expansion speed and/or a compression speed and/or an expansion damping and/or a compression damping.

BRIEF DESCRIPTION OF THE DRAWINGS

Other features and advantages of the present invention will be seen more clearly from the following detailed description of an embodiment of the invention provided by way of a non-limiting example and illustrated by the appended drawings, wherein:

FIG. 3 represents a cross-section along a vertical plane of a running gear of the test device of FIG. 1.

DETAILED DESCRIPTION

Figure 1:
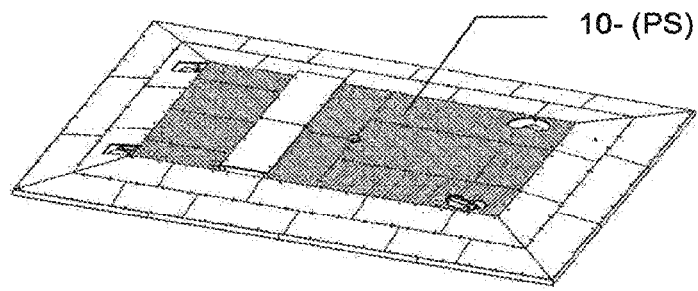
FIG. 1 represents an isometric view of a test device according to the invention.

FIG. 1 represents a test device according to the invention, which has a flattened shape with a support plate 10 that forms a support plane PS. The test device of FIG. 1 comprises four running gears, each with a wheel 20 to be able to roll on a test track (forming a rolling surface PR 100 represented in FIG. 3), and at least one of the wheels is motorized to be able to move the test device along the test track.

Typically, the test device may carry on platform 10 a dummy, and move it along the test track to serve as a target for a test vehicle. For instance, testers may be checking that the test vehicle's detection systems will actually detect the dummy and activate an emergency brake when the test device deliberately intersects the route of the test vehicle. It is also possible to have the platform 10 carry a vehicle model to simulate a collision, or again to check that the test vehicle's sensors will detect the dummy, etc. It should be noted that the test device according to the invention is not intended to transport occupants, but rather simply to move test objects, making it a handling device.

During those tests with the test vehicle, vibrations must be minimized on the carried dummy, or it must be ensured that the impacts imposed by the test vehicle do not cause the test device to rebound or damage the test vehicle.

Figure 2:
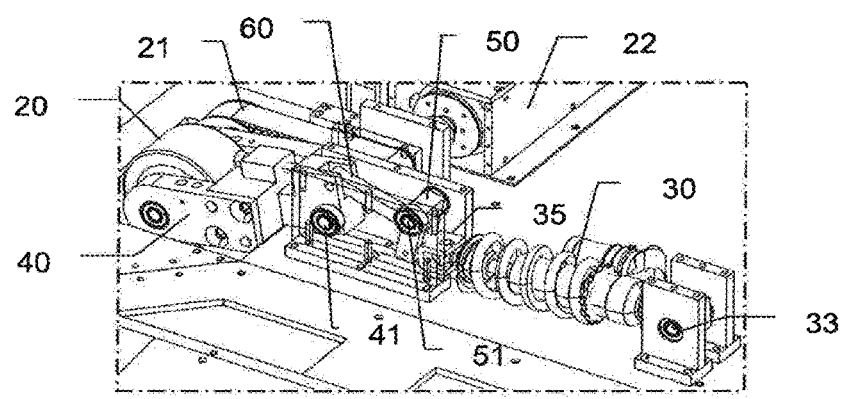
FIG. 2 represents an isometric view of a running gear of the test device of FIG. 1.
Figure 2:
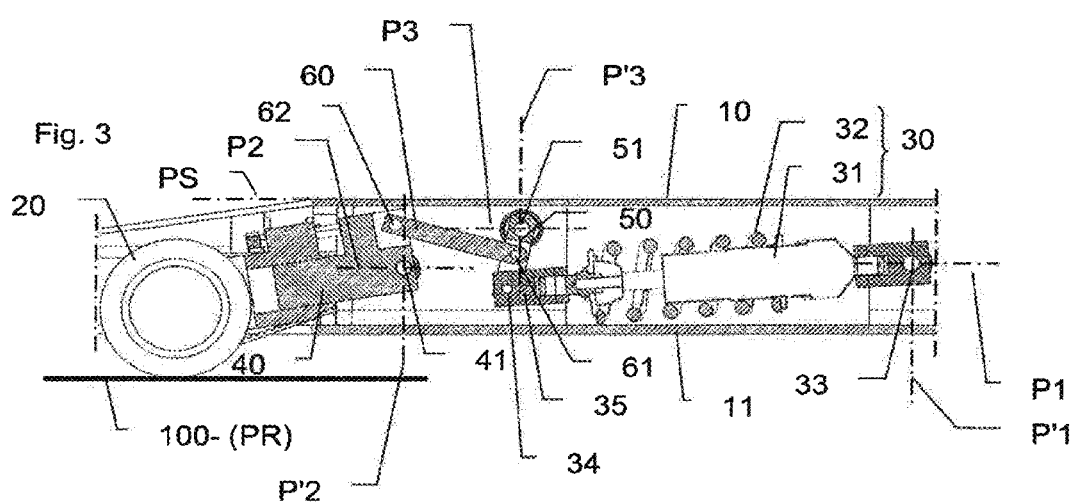

To that end, as shown in FIGS. 2 and 3, the vehicle's running gears comprise an oscillating arm 40 and a mechanism described below that connects the oscillating arm 40 to damping means 30 (in the form of a damper 31). Consequently, the movements of each wheel 20 relative to the platform 10 are damped, which minimizes the vibrations imposed on the carried target object, therefore improving the stability, which also keeps the device from rebounding if there is an impact, because the energy is dissipated by damping means 30. Means of adjusting the damping, through both expansion and compression, may be provided, depending on the testing needs.

Additionally, the damping means comprise suspension means in the form of a spring 32 to form a spring-damper combination.

Additionally, the test device must be as flat as possible, and to that end, the invention proposes a return mechanism between the oscillating arm and the damping means 30.

In particular, FIG. 2 and FIG. 3, show that each running gear therefore comprises an oscillating arm 40, as well as a tipper 50 and a rod 60. The tipper 50 is pivotably mounted on one end relative to the platform 10 and frame of the test device, at a pivot link 51, as is the oscillating arm 40 at a pivot link 41, and a first end of the damping means 30 at a pivot link 33. The other end of the tipper 50 is connected to the damping means 30 by a pivot link 34 via a cover 35.

The rod 60, meanwhile, is arranged to transmit the movements of the oscillating arm 40 to the tipper 50, while being articulated on those components respectively by pivot links 62 and 61. The pivot link 61 of the rod 60 on the tipper 50 is arranged between the two ends of the tipper 50, meaning between the pivot links 51 and 34. Consequently, the movements of the oscillating arm 40 transmitted to the damping means 30 are amplified.

Additionally, as shown in FIG. 3, the system is particularly compact, because the tipper 50 is arranged between the oscillating arm 40 and the damping means 30, which are themselves substantially mounted parallel to the support plane PS, or the rolling surface PR. Consequently, the entire mechanism is contained between two parallel planes separated by less than 80 mm. Additionally, the pivot link 33 has a pivot axis which is located within a plane P1 parallel to the support plane PS or the rolling surface PR, which is less than 20 mm and more preferably less than 10 mm away from a plane P2 containing a pivot axis of the pivot link 41, which is also parallel to the support plane PS or the rolling surface PR.

Furthermore, a plane P3 containing a pivot axis of the pivot link 51 is arranged above the planes P1 and P2, but less than 50 mm and preferably less than 40 mm away from them.

Additionally, a vertical plane P'3 (or one perpendicular to the rolling surface PR or the support plane PS) containing the pivot axis of the pivot link 51 is arranged between a vertical plane P'1 (or one perpendicular to the rolling surface PR or the support plane PS) containing the pivot axis of the pivot link 33 and a vertical plane P'2 (or one perpendicular to the rolling surface PR or the support plane PS) containing the pivot axis of the pivot link 41.

Finally, the entire mechanism is provided so that the tipper 50, in the entire provided range of motion, can move through a vertical position, as well as a straight line passing through the axes 41 and 62. The pivoting axes of the oscillating arm 40 of the tipper 50 and the first end of the damping means 30 are all parallel.

Consequently, the testing device remains compact and flat, and its total height does not exceed 120 mm, the thickness of the platform (between the platform 10 and the lower plate 11 of the device), which meanwhile remain less than or equal to 90 mm. This low height enables the testing device to pass underneath a test vehicle, and its damping capacity makes it possible to avoid rebounds, so that even when the test vehicle is running on the testing device according to the invention, the testing device will not touch the frame of the test vehicle, owing to its low height and its damping capacity.

Finally, it may be noted in FIG. 2 that the wheel 20 is powered by a motor 22 that drives a notched belt 21 engaged with the wheel 20, in order to enable the testing device to move autonomously along the test track.

It will be understood that various modifications and/or improvements obvious to those skilled in the art can be made to the different embodiments of the invention described in the present description, without going beyond the scope of the invention as defined by the appended claims. In particular, the pivot link mounts of the various members may be replaced with ball-and-socket links if need be.

The invention claimed is:

1. A movable test device for dynamic vehicle testing, intended to support a target object for a test vehicle arranged to roll on a rolling surface formed by a test track, the device comprising:
   a frame comprising a support platform arranged to receive the target object,
   a plurality of running gears each comprising at least one wheel attached to the frame and in contact with the rolling surface, wherein at least one of the running gears comprises an oscillating arm articulated on the frame and carrying the at least one wheel, means of suspension with a first end articulated on the frame, a tipper with a first end articulated on the frame and a second end linked to a second end of the means of suspension, a rod linking the oscillating arm to the tipper, wherein the rod has an end fastened onto the tipper between the first end of the tipper and the second end of the tipper, propulsion means linked to at least one of the wheels in order to propel the device on the rolling surface, damping means arranged to damp relative motion between at least one of the wheels and the support platform.

2. A device according to claim 1, wherein the means of suspension form a spring-damper combination with the damping means.

3. A device according to claim 1, wherein in a projection on the rolling surface, the articulation of the tipper on the frame is arranged between the articulation of the oscillating arm on the frame and the first end of the means of suspension.

4. A device according to claim 1, wherein the second end of the means of suspension is located under a plane parallel to the rolling surface, and passing through the articulation of the tipper on the frame.

5. A device according to claim 1, wherein both first and second ends of the means of suspension are located under a plane parallel to the rolling surface, and passing through the articulation of the tipper on the frame.

6. A device according to claim 1, wherein an envelope fully containing the means of suspension is located under a plane parallel to the rolling surface, and passing through the articulation of the tipper on the frame.

7. A device according to claim 1, wherein the rod is mounted on the oscillating arm, at a predetermined distance from the articulation of the oscillating arm on the frame.

8. A device according to claim 1, comprising a cover arranged between the second end of the means of suspension and the tipper.

9. A device according to claim 1, wherein the tipper is movable between two positions, and can have an intermediate position perpendicular to the rolling surface.

10. A device according to claim 1, wherein the oscillating arm is movable between two positions, and a straight line passing through the articulation of the oscillating arm with the frame and through an articulation between the oscillating arm and the rod may have an intermediate position perpendicular to the rolling surface.

11. A device according to claim 1, wherein the support plate is arranged to be able to pass under the test vehicle without touching it.

12. A device according to claim 1, wherein the damping means comprise adjustment means for adjusting an expansion speed or a compression speed or an expansion damping or a compression damping.

13. A device according to one of the claim 1, wherein the articulation of the means of suspension, the articulation of the tipper, and the articulation of the oscillating arm are all arranged between two planes parallel to the rolling surface and separated by a predetermined distance less than an outer diameter of the means of suspension.

14. A device according to claim 13, wherein the outer diameter of the means of suspension is a diameter of a coil spring forming the means of suspension.

\* \* \* \* \*